UNITED STATES PATENT OFFICE.

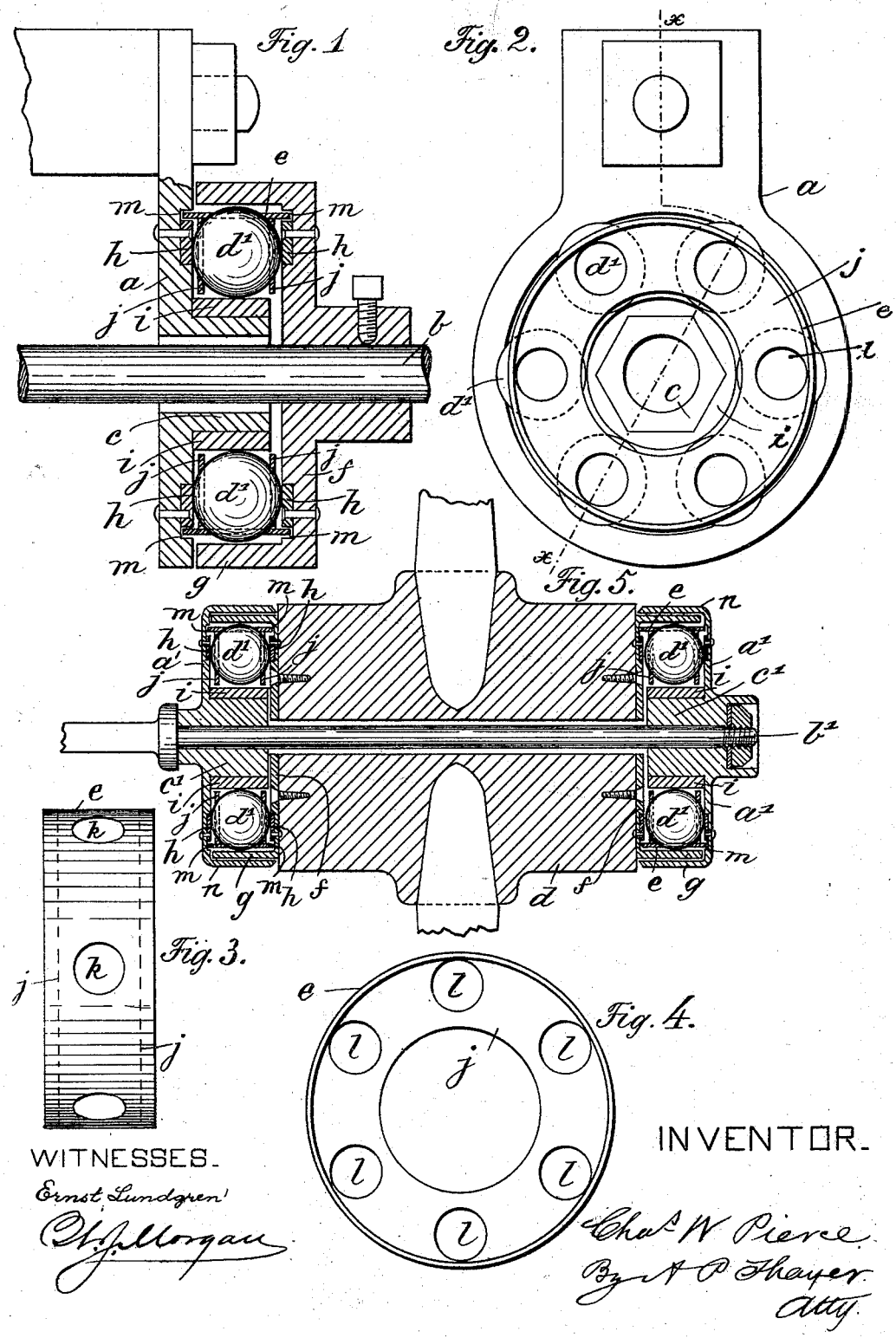

CHARLES W. PIERCE, OF OAK HILL, NEW YORK.

ANTIFRICTION SHAFT-BEARING.

SPECIFICATION forming part of Letters Patent No. 559,537, dated May 5, 1896.

Application filed July 18, 1895. Serial No. 556,348. (No model.)

*To all whom it may concern:*

Be it known that I, CHARLES W. PIERCE, a citizen of the United States, and a resident of Oak Hill, in the county of Greene and State of New York, have invented certain new and useful Improvements in Antifriction Shaft-Bearings, of which the following is a specification.

My invention consists of an improved construction of antifriction ball-bearings for shafting, as hereinafter described, reference being made to the accompanying drawings, in which—

Figure 1 is a sectional elevation of my improved shaft-bearing in the plane of the shaft. Fig. 2 is a side elevation of the hanger and the balls, the shaft and the portion of the bearing attached to the shaft being removed. Fig. 3 is a face view of the roll-keeper, and Fig. 4 is a side view of said keeper. Fig. 5 is a sectional elevation of a wagon-wheel hub, showing the application of my improved bearing to the axle.

I provide a supporting-hanger, as $a$, adapted to suspend the bearing from overhead, or a standard or other support, according to the nature of the case, said hanger or other support having a laterally-projecting hub $c$, and being perforated through the hub for the shaft $b$, the perforation being larger than the shaft to allow it to work therein without contact. On this hub I arrange a series of balls $d'$ in a keeper adapted to confine the balls thereon and maintain them at suitable regular distances apart, and on the shaft $b$ I provide a flanged collar or disk $f$, whereof the flange $g$, extending laterally from one side, encircles and embraces the balls, so as to be supported on the upper ones as they roll over the upper side of the hub, and thus carry the shaft with but very slight friction. The arrangement is also such that the balls bear at the sides on the hanger and the disk, respectively, to resist lateral thrusts and avoid friction thereat also. I prefer to reinforce the hanger and disk with hardened steel bearing-rings $h$ where the balls thus bear at the sides, and I also reinforce the hub with a hardened bearing-ring $i$, and apply it on a hub of polygonal shape of the character represented in Fig. 2, so that when worn on the side mainly subject to the wear it may be readily removed and replaced with an unworn locality in the place for sustaining the wear.

The keeper consists of a thin metallic cylindrical ring $e$, wider than the balls and the space between the side of the hanger and the side of the disk, and a little less in diameter than the circle including the balls, with two annular flat rings $j$ of like thin metal fitting and secured to the cylindrical ring within the same, inside of the edges, and at a less distance apart than the diameter of the balls, said ring $e$ and rings $j$ having perforations $k$ and $l$, respectively, allowing the balls to protrude for contact with the flange $g$ and the hanger and the disk, respectively.

The hanger and disk each have an annular groove $m$ to make room for the projecting edges of the ring $e$, which is necessarily wider than the space between them for strength of material at the sides of the holes $k$. The ring $e$ and one of the side rings $j$ being secured to each other with their holes $k$ and $l$ suitably coincident for the balls, the balls are then placed in position, and then the other side ring is applied and also secured, and thereby the balls are confined in the keeper, so that they are retained in their places when unapplied in the bearing, thus rendering the bearing more convenient for handling than when the balls are only confined in the assembled parts of the bearing.

In Fig. 5 I represent the application of the invention to a wagon wheel and axle, in which the axle, which does not rotate, is carried by the hub which rotates. $d$ represents the hub of the wheel, and $b'$ the axle. The disk $f$, having the flange $g$, is attached to the end of the hub, and the balls roll in said flange, same as in the shaft-hanger, except that the weight is sustained by the flange below the axis of rotation instead of above. The hub $c'$ and disk $a'$, corresponding to the hanger $a$ and hub $c$ of Figs. 1 and 2, are secured to the axle and the hub bears on the balls below the axis, said hub having a like wearing-ring $i$. The disk $a'$ is represented with a flange $n$ overlapping flange $g$, which is intended for a dust-cap, but is not an essential part of the bearing. The keeper for the balls and the bearing-rings $h$ are alike in this application of the invention as in the other and the description of them need not be repeated. In this example of my invention I have represented only one set of balls in the shaft-bearing; but it is manifest that the balls and other parts of the bearing may be duplicated either on the same side or on the other side of the hanger, as desired, and in the application of the invention to a wagon a complete bearing is employed at each end of the hub, and I do not therefore limit myself in this respect. The side rings $j$ of the keeper may be soldered in ring $e$, for securing them.

I claim—

1. In a ball-bearing, the combination of the stationary part on which the balls roll, the rotating part carried on the balls, the series of balls and the keeper for the balls, said keeper consisting of the perforated cylindrical ring and perforated annular rings through which the balls project for contact with the bearings exterior to the balls substantially as described.

2. The combination in a ball-bearing, of the hanger having the lateral hub, the laterally-flanged disk for confining the balls on the hub, the series of balls interposed between the hub and the inner face of the said flanged disk, and the keeper for the balls consisting of the perforated cylindrical ring and the perforated annular rings through which the balls protrude to bear on the said flanged disk and the hanger substantially as described.

3. The combination with the hanger having the laterally-projecting hub, the laterally-flanged disk attached to the shaft, the balls interposed between the said flanged disk and the hub, and the keeper for the balls, of the reinforcing-rings in the sides of the hanger and the disk substantially as described.

4. The combination with the hanger having the laterally-projecting hub, the laterally-flanged disk attached to the shaft, the balls interposed between the said flanged disk and the hub, and the keeper for the balls, of the reinforcing-ring for the hub, said ring secured adjustably around the hub substantially as described.

5. The combination with the hanger having the laterally-projecting hub, the laterally-flanged disk attached to the shaft, balls interposed between the said flanged disk and the hub, and the keeper for the balls, said hanger and flanged disk having the grooves for the projecting edges of the keeper, and the keeper having the cylindrical ring wider than the diameter of the balls substantially as described.

Signed at Oak Hill, in the county of Greene and State of New York, this 8th day of December, A. D. 1894.

CHARLES W. PIERCE.

Witnesses:
FRANK WHITCOMB,
SCOTT CHERITREE.